(12) United States Patent
Jokinen

(10) Patent No.: US 6,748,219 B2
(45) Date of Patent: Jun. 8, 2004

(54) METHOD FOR DYNAMICALLY MAPPING CHANNELS FOR NEW GSM FREQUENCY BANDS

(76) Inventor: Harri Jokinen, Vähähiidentie 450, FIN-253700 Hiisi (FI)

( * ) Notice: Subject to any disclaimer, the term of this patent is extended or adjusted under 35 U.S.C. 154(b) by 236 days.

(21) Appl. No.: 10/040,896

(22) Filed: Jan. 2, 2002

(65) Prior Publication Data

US 2002/0102980 A1 Aug. 1, 2002

Related U.S. Application Data

(60) Provisional application No. 60/260,486, filed on Jan. 9, 2001.

(51) Int. Cl.[7] ................................................. H04Q 7/20
(52) U.S. Cl. ..................... 455/446; 455/450; 455/422.1
(58) Field of Search .............................. 455/403, 422.1, 455/446, 450, 452.1

(56) References Cited

U.S. PATENT DOCUMENTS

| | | |
|---|---|---|
| 5,711,005 A | 1/1998 | Farrag |
| 5,960,351 A | 9/1999 | Przelomiec |
| 6,230,026 B1 * | 5/2001 | Schwaller et al. .......... 455/561 |

OTHER PUBLICATIONS

*Dynamic channel numbering for new GSM frequency bands*, 3GPP TSG–GERAN Meeting #2, Norrtälje, Sweden, 6.–10.11.2000.

*Proposal for dynamic channel numbering in GSM REL–4*, 3GPP TSG–GERAN Meeting #3, Boston, USA, Jan. 15–19, 2001, GP–01097, Agenda item 6.6 (7.2.5.10).

* cited by examiner

*Primary Examiner*—Marsha D. Banks-Harold
*Assistant Examiner*—James K Moore
(74) *Attorney, Agent, or Firm*—Ware, Fressola, Van Der Sluys & Adolphson LLP

(57) ABSTRACT

An apparatus and method for providing a dynamic mapping of channel numbers to physical frequencies for some cells of a cellular telephone system, for use in case of a cellular telephone system representing physical frequencies by channel numbers and providing a fixed mapping of channel numbers to physical frequencies. The method includes a step of providing an information element indicating the dynamic mapping, and is performed in a way that is compatible with an existing channel numbering space, thereby keeping unchanged any existing signaling messages. The method also provides for a change in a dynamic mapping: a duplicated mapping is broadcast in which two non-overlapping sets of channel numbers are both mapped at least in part to a same frequency block, the broadcasting being continued for a predetermined time assumed to be of sufficient extent that any mobile phones operating in the cells will have decoded the duplicated mapping.

34 Claims, 3 Drawing Sheets

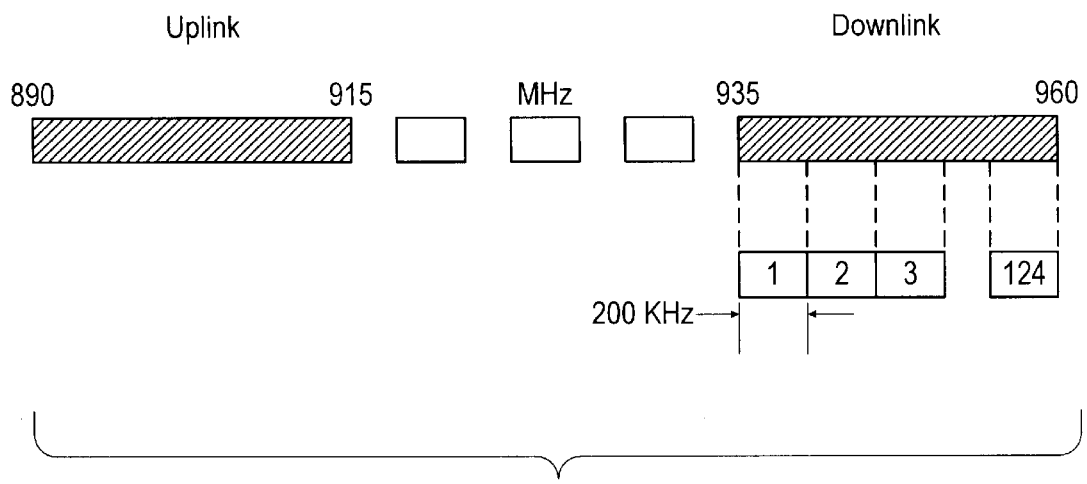

Fig. 1

```
┌─────────────────────────────────────────────┐
│ Determine duplicated mapping for the public land mobile │
│ network, including a before mapping component and an   │
│ after mapping component, where the before and after    │
│ mapping components use different (non-overlapping)     │
│ blocks of channel numbers.                             │
└─────────────────────────────────────────────┘
                        │
                        ▼
┌─────────────────────────────────────────────┐
│ Broadcast or otherwide communicate the duplicated │
│ mapping to each mobile phone in the cells of the public │
│ land mobile network, and if broadcasting, do so for a time │
│ corresponding to an assumed longest possible call that │
│ might be made.                                          │
└─────────────────────────────────────────────┘
                        │
                        ▼
┌─────────────────────────────────────────────┐
│ Begin using the dynamic mapping with the new mapping │
│ component.                                          │
└─────────────────────────────────────────────┘
```

Fig. 3

METHOD FOR DYNAMICALLY MAPPING CHANNELS FOR NEW GSM FREQUENCY BANDS

CROSS REFERENCE TO RELATED APPLICATION

Reference is made to and priority claimed from U.S. provisional application Ser. No. 60/260,486, filed Jan. 9, 2001, entitled DYNAMIC CHANNEL NUMBERING FOR NEW GSM FREQUENCY BANDS.

FIELD OF THE INVENTION

The present invention relates to cellular communications, and more particularly to the assignment (mapping) of channel numbers to physical frequencies, for use in communications under the global system for mobile communications (GSM).

BACKGROUND OF THE INVENTION

Various bands are provided by the global system for mobile communications (GSM) standard for cellular communications, including the GSM 900 band (which in turn includes an extension band, called the E-GSM band), R-GSM for railway cellular communications, and, for traditional cellular applications, the DCS 1800 band, the PCS 1900 band, GSM 450, GSM 480, GSM 850 and the newly added GSM 700 band. Each band is divided into two sub-bands, an uplink sub-band and a downlink sub-band. The uplink sub-band is for mobile transmission (to the serving base station), while the downlink sub-band is for base station transmission to a mobile phone. Each sub-band is divided into 200 kHz frequency slots, each such frequency slot being indicated by an ARFCN (Absolute Radio Frequency Channel Number). Each ARFCN is shared by up to eight mobiles, each using it in turn in a time division multiplex mode, i.e. each mobile is assigned a frequency slot and a time slot in a time division multiple access (TDMA) frame. The combination of a succession of time slots (every eighth time slot beginning with a specified time slot, such as every 3rd time slot out of every eight time slots) and a frequency slot (specified by an ARFCN) indicates what is called a physical channel.

The GSM band, which is illustrated in FIG. 1, and the corresponding mapping from channel numbers (i.e. ARFCNs) to physical frequencies is:

$F_{up}(n) = 890.2$ MHz $+ 0.2*(n-1)$ MHz ($1 \leq n \leq 124$), and $F_{down}(n) = 935.2$ MHz $+ 0.2*(n-1)$ MHz ($1 \leq n \leq 124$).

The extension band is as follows:

$F_{up}(n) = 880.2$ MHz $+ 0.2*(n-1)$ MHz ($1 \leq n \leq 50$), and $F_{down}(n) = 925.2$ MHz $+ 0.2*(n-1)$ MHz ($1 \leq n \leq 50$).

In both of these mappings, i.e. in both the GSM band and the extension band, the quantity n is the ARFCN. As mentioned, a physical channel consists of a carrier frequency given by the ARFCN, and every 8th time slot on the frequency, each time slot having a duration of 4.615/8 ms, often denoted as a burst, there being 8 time slots in a TDMA frame, which therefore has duration 4.615 ms.

The total number of ARFCNs currently supported by GSM signaling is 1024. Excluding GSM 700 (i.e. release 4 of the 3GPP standards), a total of 262 ARFCN values are unused. (GSM 900 uses 124+50 ARFCNs; R-GSM uses 20 ARFCNs; DCS 1800 uses 374 (PCS 1900 uses a subset of DCS 1800 numbers); GSM 400 uses 35+35 numbers, and GSM 850 uses 124. The total amounts to 762 ARFCN values.) However, only two separate large blocks of unallocated ARFCNs exist, 341–511 and 886–954, supporting a total bandwidth of 48 MHz (a total of 240 ARFCN values). Allocating 15 MHz or 74 carriers (at 200 kHz per carrier) (and also a 200 kHz guard band for the operating band) for GSM 700 would leave a very limited number of ARFCNs for future frequency bands, not enough to support any new band allocation like the planned 2.5 GHz IMT (International Mobile Telephony) 2000 extension band.

ARFCNs are currently defined with 10 bits. Several signaling messages include ARFCNs. An obvious alternative to extend the ARFCN range would be to use more than 10 bits. However, such a change would also change all messages that include ARFCNs, and would also change many other messages that do not contain ARFCNs but refer to them.

What is needed, therefore, is a new, dynamic ARFCN allocation procedure that would maintain the existing signaling messages, mostly unchanged, but would also make possible supporting significantly wider spectrum allocations compared to the existing fixed ARFCN mapping. Ideally, no changes to information elements referring to 10-bit ARFCNs would be made.

SUMMARY OF THE INVENTION

Accordingly, the present invention is an apparatus and corresponding method for providing for a dynamic mapping of channel numbers to physical frequencies for some cells of a cellular telephone system, the method for use in case of a cellular telephone system representing physical frequencies by channel numbers and providing a fixed mapping of channel numbers to physical frequencies, the cellular telephone system composed of a plurality of public land mobile networks each of which provide coverage in a different set of cells of the cellular telephone system, the dynamic mapping to be used by a particular public land mobile network and so for all the cells for which cellular communication is provided by the particular public land mobile network, the method including the steps of: selecting a set of physical frequencies; selecting from the channel numbers a set of channel numbers sufficient in number to correspond, one-to-one, to the selected physical frequencies; determining a dynamic mapping of the selected physical frequencies to the selected set of channel numbers; and providing to mobile phones in the cells of the public land mobile network an information element indicating the dynamic mapping, the information element including information sufficient to determine the first and last channel number of the dynamic mapping and the first and last physical frequency of the dynamic mapping; wherein the step of providing the information element indicating the dynamic mapping is performed in a way that is compatible with an existing channel numbering space, and so allows keeping unchanged any existing signaling messages.

In a further aspect of the invention, the channel numbers are represented using numbers indicated by at most 10 bits.

In another further aspect of the invention, the cellular telephone system has unused channel numbers and unused physical frequencies. In some applications according to this aspect of the invention, in the step of selecting a set of physical frequencies, the physical frequencies are selected from the physical frequencies not used by the public land mobile network but available for use by the public land mobile network. In some of these applications, in step of selecting channel numbers, the channel numbers are selected from the channel numbers not used by the public land mobile network but available for use by the public land mobile network; and in such applications, the dynamic mapping is sometimes specific to the public land mobile network in that the dynamic mapping would provide channel numbers for only the frequencies actually used by the public land mobile network.

In another further aspect of the invention, the information element includes: a first value indicating the first channel number being mapped; a range value indicating the number of channel numbers being mapped in addition to the channel number indicated by the first value; and a first frequency value, indicating the physical frequency to which the first channel number is being mapped.

In yet another further aspect of the invention, so as to provide for a change in a dynamic mapping being used by a public land mobile network, a duplicated mapping is broadcast by the public land mobile network in which two non-overlapping sets of channel numbers are both mapped at least in part to a same frequency block, the broadcasting being continued for a predetermined time period assumed to be of sufficient extent that any mobile phones operating in the cells of the public land mobile network will have decoded the duplicated mapping. In a still further aspect of the invention, instead of broadcasting the duplicated mapping, the public land mobile network conveys the duplicated mapping via a point-to-point transmission to each mobile phone using the public land mobile network.

Thus, with the present invention it is possible to maintain all existing signaling messages unchanged. The changes to signaling are limited to providing two new system information messages, one for broadcast and one for dedicated mode. In addition, one GPRS Packet System Information message is extended with relevant information, and the GSM handover command is extended to include dynamic mapping information.

BRIEF DESCRIPTION OF THE DRAWINGS

The above and other objects, features and advantages of the invention will become apparent from a consideration of the subsequent detailed description presented in connection with accompanying drawings, in which:

FIG. 1 is a block diagram, according to the prior art, of the existing fixed mapping in GSM of channel numbers to physical channels;

FIG. 3 is a flowchart of a further aspect of the invention, a method for providing for a change in the dynamic mapping being used by a public land mobile network without disrupting operation of the public land mobile network.

BEST MODE FOR CARRYING OUT THE INVENTION

Figure 2:
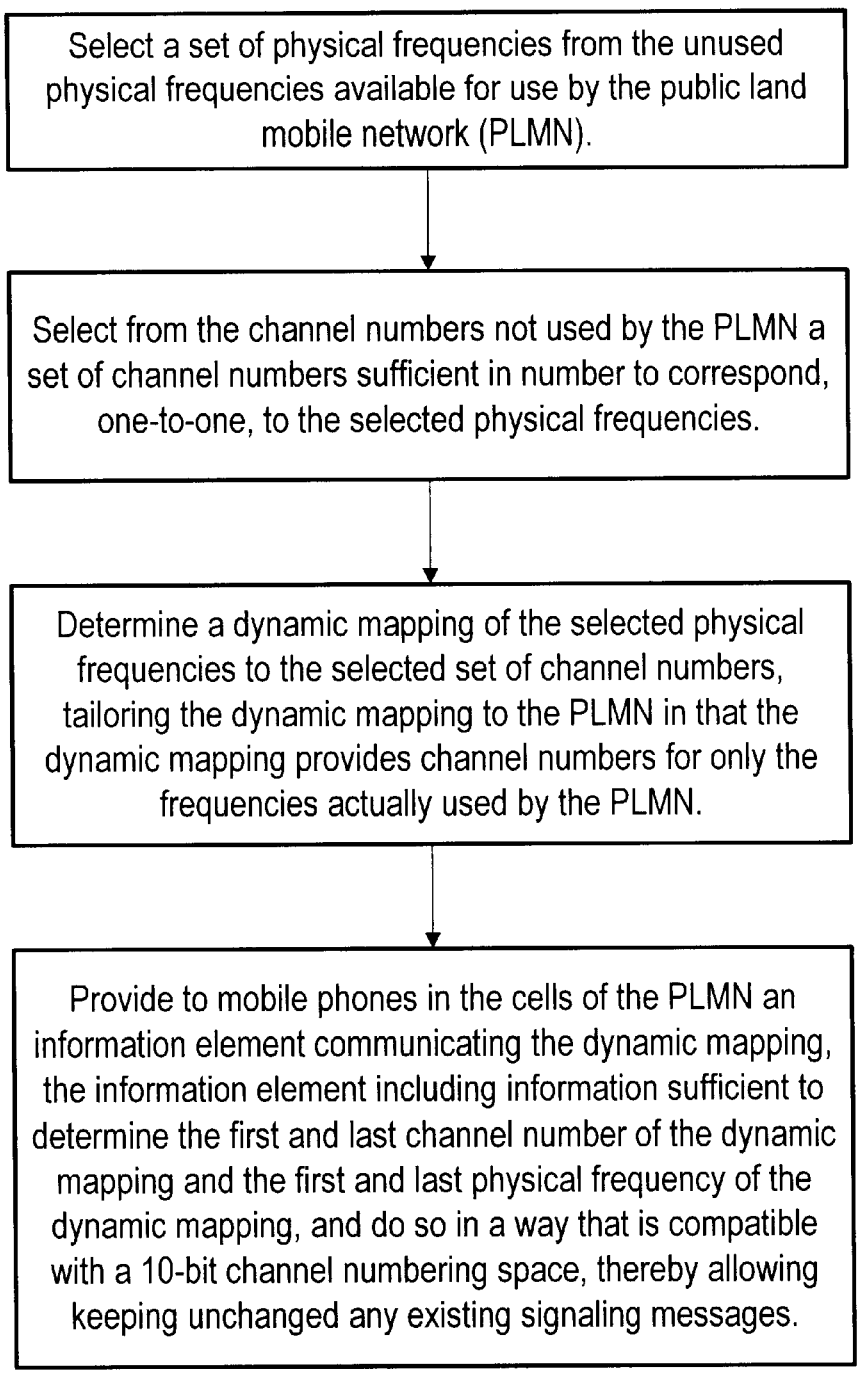
FIG. 2 is a flowchart of the method of the invention.

The invention is a method of providing, for a cell of a cellular telephone system, a (dynamic) mapping of channel numbers to physical frequencies in addition to the mapping providing by the fixed ARFCN mapping. The invention provides the content of the mapping as well as a means of communicating the mapping to mobile stations in the cell. The invention provides such a mapping in a way that maintains the 10-bits ARFCN numbering space, and so keeps the existing signaling messages unmodified as far as possible.

In the preferred embodiment, the invention provides a new information element to be used to dynamically map ARFCN values to physical frequencies. The new information element would be broadcast, likely within a new SI/PSI (system information/packet system information) message, so as to provide a PLMN (Public Land Mobile Network) specific mapping of ARFCNs to physical frequencies, instead of the current fixed mapping in 3GPP TS 45.005 (analogous to GSM 05.05, which is for an earlier release) where the designation of carrier frequencies has been fixed, i.e. where there is a one-to-one fixed mapping between ARFCNs and physical carrier frequencies. (A PLMN is a subnetwork of a cellular telephone system, in particular a UMTS (Universal Mobile Telecommunications System) network. A PLMN is operational either on its own or together with other subnetworks, and is distinguished from other PLMNs by a unique identifier. Typically one PLMN is operated by a single operator, and is connected to other PLMNs as well as to other types of networks, such as ISDN, PSTN, and the Internet.) While the mapping of ARFCNs is currently fixed in 3GPP TS 45.005 (or GSM 05.05), the dynamic mapping according to the invention allows a specific range of ARFCNs to be used for designating a range of physical frequencies with practically no limitations. Such flexibility results in the efficient use of ARFCNs in the sense that ARFCNs are mapped only for those frequencies that are actually used by the operator of the PLMN. The older (fixed mapping) method, where for example for DCS 1800, the ARFCN values from 512 to 885 are all used by the fixed mapping scheme even if a single operator (or a single PLMN) would never use the whole band, is correspondingly less efficient. (One operator could have 20 MHz of bandwidth and thus a mere 100 ARFCNs would be sufficient, but the older scheme would map the entire 75 MHz band of frequencies using 374 ARFCN values.)

Thus, by providing a mapping that is PLMN specific, the invention makes efficient use of ARFCNs because ARFCNs are only mapped for a PLMN for those frequencies used by the PLMN, not for all frequencies supported by the standard. In providing a dynamic mapping of ARFCNs, the invention extends the current signaling capability to support new frequency allocations, i.e. to provide new spectrum support, while maintaining the 10-bits ARFCN numbering space, and so keeps the existing signaling messages unmodified as far as possible. By keeping the ARFCN numbering space at 10 bits, the invention avoids having to use different decoding rules for different messages (depending on whether 10 bits are used or more than 10 bits are used for ARFCNs); it also avoids having to segment some messages as a result of their increased length (which because of an unavoidable increase in the failure rate of a segmented message compared to a shorter, unified message, would cause an increase in the failure rate of handover); and it also avoids having to duplicate some messages (specifically broadcast messages) because legacy mobile terminals would not understand messages having longer ARFCNs (whereas legacy mobile terminals do correctly ignore 10 bit ARFCNs that have been dynamically mapped but are intended for frequency bands that they do not support).

The new information element could, in an exemplary embodiment, consist of the following three parameters (which would be repeated for each separate frequency block):

ARFCN_FIRST, which would be used to indicate the first ARFCN value to be dynamically mapped (10 bits);

ARFCN_RANGE, which would indicate the number of ARFCN values, subsequent to the ARFCN_FIRST, that are dynamically allocated (in the range of 5 to 8 bits); and ARF_FIRST, which would indicate the Absolute Radio Frequency corresponding to ARFCN_FIRST, i.e. the physical frequency corresponding to the first dynamically allocated ARFCN (could be 14 bits or less).

In such an embodiment, one possible coding for ARF_FIRST could be the coding used by the UMTS Terrestrial Radio Access Network (UTRAN), which supports all frequencies below 3.2768 GHz. The invention thus extends the supported frequency range to at least the same extent as UTRAN signaling. (The 3GPP TS for UTRAN (WCDMA) has a definition for 14-bit UARFCNs; the UTRAN definition for UARFCN can be found from TS 3GPP 25.101.)

It is advantageous to keep the amount of unallocated ARFCN values and the size of continuous blocks as large as possible, and a scheme for such (i.e. a dynamic mapping scheme) has already been proposed for GSM 700, a scheme in which keeping the amount of unallocated ARFCN values and the size of continuous blocks as large as possible would be made a mandatory feature for all Release 4 mobiles.

FIG. 2 is a flowchart of a method of providing according to the invention a dynamic mapping for a public land mobile network.

Options for Providing to a Mobile Station Information about a Dynamic Mapping

To provide for dynamic mapping of channel numbers for use by a mobile station (MS), information about the mapping must be provided to the MS so as to allow initial access by the MS and subsequent registration of the MS to the network. One way to provide the dynamic mapping to the MS is to broadcast a new information element, either in an existing system information (SI) message, in a new SI message, or in a combination of a new SI message and an existing SI message, where the existing message content is extended to include information about the dynamic mapping. In the preferred embodiment, dynamic mapping information is provided for the MS through the BCCH (broadcast control channel) when the MS is idle (not using a dedicated connection) and through the SACCH (slow associated control channel) when the MS is in connected mode (when the MS is not able to read the BCCH information but can still read the SACCH information, the SACCH always being available). In addition, for GPRS attached mobiles (not in dedicated mode) the information is provided through PBCCH (packet broadcast control channel) if the PBCCH exists in the cell, and if not, then GPRS attached mobiles read the BCCH. In the preferred embodiment then, for both the BCCH and the SACCH, new SI messages are defined, while for GPRS, the information is added as part of an existing PSI message (for cells using PBCCH).

No broadcast information is needed if the cell is using a non-hopping SDCCH (stand alone dedicated control channel) on the BCCH carrier and all necessary information about dynamic mapping is provided to the mobile station through the SACCH. In case the mapping information is only partially provided by broadcasting, a means for sending the mapping information in dedicated mode is also required. Dedicated mode support is preferable in other situations as well. However, because of restrictions related to the above cases, the option to broadcast dynamic mapping is preferred.

In order to provide the service referred to as other systems to GSM handover (where by other systems is meant any other system that supports inter-working with GSM, which in practice means UTRAN or WCDMA, but could also include CDMA 2000 as well as other, future systems), the dynamic mapping should be added to the corresponding handover command, because there is a possibility that a MS being handed over has not had a chance to read any valid mapping information (from the relevant GSM system) before receiving the handover command.

The mapping preferably covers the full frequency allocation used by a particular PLMN, but need not cover all frequencies in all possible frequency bands. Having the mapping cover the full frequency allocation used by a particular PLMN would make available 240 ARFCN values to cover new frequency bands of up to hundreds of MHz, assuming that the new bands are shared among several operators (e.g. among the six operators currently sharing in Germany the IMT-2000 frequency band).

Validity of Mapping Information

In some embodiments, including the preferred embodiment, the dynamic mapping in a live network is changed (a live network being a network that is in operation, with ongoing calls) when there is a change in the frequency allocation either within a specified, existing frequency band or within a new frequency band (although changing the dynamic mapping in the latter case is not always necessary, an extension to the current mapping usually being sufficient). A MS may be in idle mode or in dedicated mode at the time the mapping changes. It is necessary to guarantee that a MS is using the correct information for dynamic mapping at the time the network modifies the dynamic mapping unless the dynamic mapping is added to all relevant signaling messages. However, since the dynamic mapping is envisioned to change only rarely, it is preferable to have each MS use the dynamic mapping obtained at switch on (either by reading the dynamic mapping from the BCCH or by having the mapping provided during network registration), which would allow providing critical messages like a handover command without increasing signaling message size.

Dynamic Mapping for Currently Allocated ARFCNs

There are two different types of ARFCN values, those that are used in pre-Release 4 standards, i.e. for frequency bands that have been defined before Release 4, and those that are not used in pre-Release 4 releases, which are the type that can be used without any restrictions for dynamic ARFCN mapping. There are some restrictions concerning how the first type of ARFCN values can be used for dynamic mapping.

Unallocated ARFCN values allow the highest flexibility for dynamic mapping. However, in some cases it could be useful to allow remapping of existing ARFCN values, such as when an operator does not support the R-GSM frequency band. If such an operator supports GSM 700, the operator could remap the R-GSM ARFCN values so as to be used by the GSM 700 system. (For GSM, there is really no need at present for remapping allocated ARFCN values. The need would really only occur if new bands are specified for GSM and there are then no more "unallocated" ARFCN values.) When the R-GSM ARFCN values are remapped, there is no difference between a Release 4 MS and when other, unallocated values are used. For a pre-Release 4 MS supporting the R-GSM band, there would be a minor disadvantage in remapping existing ARFCN values in that the pre-Release 4 MS would monitor R-GSM frequencies, but would discard those measurements based on proper NCC-allowed (network color code allowed) settings. Mobiles would have to perform some unnecessary neighbor cell RXLEV measurements (received signal level measurements for a neighbor cell) and these mobiles would try to synchronize to those cells in order to identify them. However, when the MS decodes the BSIC (base station identity code), it recognizes that the neighbor cell does not belong to the serving PLMN. This again is based on the fact that the serving cell provides NCC-allowed information to the MS, and part of the BSIC should match up with the allowed NCC values. Now if the NCC-allowed information is set so that all R-GSM networks in the cell area use an NCC value that is not allowed, then the MS simply ignores measurements on those carriers and there is no possibility of false behavior such as a handover command to an incorrect cell based on false measurement reporting.) (Note that the useful number of RXLEV samples for those bands supported by a pre-Release 4 MS would still be equal to the number of samples for a Release 4 MS that supports GSM 700). The minor disadvantage faced by a pre-Release 4 MS could be solved by adding dynamically mapped neighbor cells into SI2x messages that are ignored by pre-Release 4 mobiles. However, the possibility of using existing SI2 messages that would be common to all mobiles is believed to be the preferred option. (Common SI5 messages would also be advantageous. SI5 messages are the dedicated mode messages corresponding to the broadcast mode SI2 messages (SI2, SI2bis, SI2ter, SI2quater), which provide neighbor cell information.)

Dynamic mapping of currently fixed ARFCNs would also make it possible to support multiband operation between frequency bands not currently supported. For example, a MS operating on the 850 MHz band should be made to assume ARFCN values 512–810 to address PCS 1900 frequencies instead of DCS 1800 frequencies (by having the network set the band indicator bit so that 850 mobiles decode common 1800/1900 ARFCNs as 1900 frequencies). A country that uses GSM 850 and DCS 1800, could use dynamic channel numbers on the 850 MHz band, pointing to the 1800 MHz band. Then a Release 4 mobile or a later MS could support dual band operation between these two bands.

A difficulty with currently fixed ARFCNs is that DCS 1800 and PCS 1900 frequency bands are defined so as to use overlapping ARFCNs, i.e. all of the PCS 1900 ARFCNs are also used for DCS 1800, so that using both DCS 1800 and PCS 1900 simultaneously is not possible (without the invention). As a result, an ARFCN does not uniquely identify the corresponding carrier frequency; the MS must use some other information to interpret ARFCNs correctly. So far, the overlapping has not been a problem because there has been no MSs simultaneously supporting the 1900 frequency band and any other frequency band, and so far there has been no need for such support. Current triple-band phones do not support simultaneously 900, 1800 and 1900 bands; such phones revert to 1900-only support or 900/1800 support, depending on the country where they are used. The problem of 1800/1900 simultaneous support can be solved with dynamic ARFCN mapping. Dynamic ARFCN mapping could be used to solve other types of multiband operation as well.

Subscriber Identification Module (SIM)

Normally a MS would store the latest valid BCCH allocation (the list of neighbor cell frequencies of a particular cell, normally stored in the SIM in order to help the MS find service if switched on close to the area where it was switched off) at switch off in the SIM (subscriber identification module) in order to allow faster registration to the last registered PLMN at next switch on. This is not possible unless the SIM is modified either to support storing 14 bit ARFCNs or to allow including the mapping information related to applicable 10-bits ARFCN values. According to the invention, the storing of the latest BA to the SIM is not provided for those ARFCNs that have no fixed mapping, i.e. for the dynamically allocated ARFCNs. The MS may optionally store the BA including dynamically mapped ARFCNs, as is done today for all other frequencies. Assuming that the information is available internally at the MS, i.e. is stored in the MS, normally any additional delay in initial access can be avoided.

An Exemplary Application of Dynamic Channel Mapping

Unrestricted support for multiband operation was identified as another potential application for dynamic numbering. As an example, a MS supporting GSM 700 currently would assume that ARFCNs common to both DCS 1800 and PCS 1900 should be interpreted as PCS 1900 frequencies if the numbers are transmitted on the GSM 700 band. For example, dynamic ARFCN mapping according to the invention allows full multiband operation for Release-4 terminals on networks using GSM 700 and DCS 1800 and/or PCS 1900 frequency bands.

Special Considerations

The invention is described below in respect to situations for which special considerations are in order.

Interworking with UTRAN or any Other Non-GSM System

It is possible that a MS may have obtained service through a non-GSM system before entering a GSM coverage area. According to the invention, in order to support non-GSM to GSM handovers, the information about dynamic mapping is preferably included in the non-GSM to GSM handover message provided to the MS by the serving base station, i.e. the non-GSM base station (with the main part of the handover message built up by the target system base station, i.e. the GSM base station).

Changes to the Dynamic Mapping During Service

There is also a need to support changes in a dynamic mapping in use in such a way that service by the network is not interrupted. Adding new frequency allocations is straightforward, but there may be a need to change the mapping of a frequency band that is already being used. An example is a merger of operators of two different non-cooperating networks (in respect to the dynamic mapping), using different mappings for the same ARFCNs. In such a situation, to support handovers between the two networks, the dynamic mapping must be changed (for one or the other network) or both dynamic mappings must be changed so that after the change, the mappings are compatible, and the change must be made without any interruption of ongoing calls. Typically, the need to change an existing dynamic mapping would occur very rarely, perhaps once per year. Even so, it would not be acceptable to have service be temporarily unavailable until a new mapping is activated and decoded by all mobiles.

To deal with changes in dynamic mappings, one solution would be to use the same method as is used in UTRAN to cope with changes in preconfiguration. UTRAN has a similar problem; the preconfiguration data used there must be broadcast and that data may need to be changed. UTRAN controls changes in the preconfiguration data using a so-called change mark, but that method is not suitable in the present circumstance. With the change-mark method, an A/B indicator is used in which two different dynamic mappings, A and B, are broadcast simultaneously and the A/B indicator is added to all relevant messages referring to ARFCNs. A disadvantage of the A/B indicator method is that even if only a single bit is used as the A/B indicator, it must be added to a significant number of different signaling messages.

Instead of a change-mark method, the present invention takes into account that the dynamic mapping is needed for mapping in one direction only, from any ARFCN to a physical frequency, and so a simple broadcast-based solution is used. In the present invention, a duplicated mapping is broadcast, for a sufficiently long time period, for the frequency block whose mapping is to be changed. (A dynamic mapping is usually comprised of several different mappings, the different mappings for mapping different blocks of channel numbers to different frequency blocks licensed for the operator of the PLMN using the dynamic mapping.)

For example, if an operator of a PLMN is using four separate frequency blocks where dynamic mapping is applied, the operator can handle a change in the dynamic mapping if, for a limited period of time, a duplicate mapping (provided by a parameter set) is added for the frequency block where the mapping is to be changed. The new parameter set is valid after the change, and the parameter set valid before the change is kept during a transition period. Such a duplicate mapping is possible if the before and after parameter sets of ARFCNs of the dynamic mapping are completely separate (non-overlapping) in that the before and after parameter sets (provided by the duplicate mapping) use a different ARFCN range, but both cover, at least partially, the same physical frequency band. No signal is needed indicating when the change is to occur, which is important since it would be difficult to effecting a change at a specific time in several different cells.

According to the invention, the network broadcasts the duplicate mapping for a period equal to the assumed length of the longest call. The broadcasting may be performed for a period ranging anywhere from one hour to several weeks. The invention assumes that after the broadcast period, all mobiles have entered idle mode and have decoded the new broadcast system information. Once all mobiles have decoded the duplicated mapping, the network can start sending only the new mapping (i.e. the network can remove the mapping for the old frequency allocation from the system information messages.

The procedure according to the preferred embodiment of the invention, as applied in one particular scenario, is indicated step-by-step below.

Assume that the network is initially broadcasting on BCCH dynamic mapping for four different frequency blocks: DM1, DM2, DM3 and DM4.

Assume that DM1 covers the frequency range from x to x+5 MHz, and that the frequency band allocated for the operator is changed to the range from x−5 MHz to x+2 MHz (i.e. the frequency band is extended in width and also changed at the same time). The operator then broadcasts a new dynamic mapping DM1, DM2, DM3, DM4 and DM5 where the old frequency allocation is mapped by DM1 and the new allocation is mapped by DM5. According to the invention, the ARFCNs used for DM1 and DM5 are to be non-overlapping.

Once the operator has broadcast the new system information for a suitable time period, such as for example for twenty-four hours, the change in the frequency allocation is carried out. Note that the change in the frequency allocation (per the dynamic remapping) is made just like a change in a fixed numbering scheme; for a given cell, the change is made simultaneously for all active network resources in the cell (i.e. all different types of channels, those used by mobiles in dedicated mode as well broadcast channels), including changes in neighbor cell SI messages (system information messages that define the neighbor cell BCCH frequencies, i.e. the frequencies a MS should listen to when identifying neighbor cells and when ranking them for cell reselection). In addition, a new cell may be added to the network or additional carriers may be allocated to an existing cell independently of changes in dynamic mapping, and vice versa. If a cell is using frequency hopping and new carriers are added to that cell, then all mobiles in dedicated mode (and also usually other mobiles) should be ordered to begin using the new set of frequencies simultaneously.

At any time after (or simultaneous with) the carrying out of the change in the frequency allocation, the operator may start sending dynamic mapping excluding DM1, i.e. including only DM5, DM2, DM3 and DM4. (In practice, the change in frequency allocation is performed on a cell-by-cell basis, whereas the dynamic mapping is valid for the whole PLMN, i.e. for several cells. Thus, it is usually necessary to support a duplicated mapping until the last cell in the PLMN begins using the new resources. One should also take into account that a change in dynamic mapping may be needed even if there is no change in frequency allocations, such as in the merger of two separate networks into a single network, as described above.)

If there is no change in frequency allocation but a change in dynamic mapping is performed for other reasons and the new mapping is valid for both the old and the new frequency allocation, the duplicated mapping is first broadcast for 24 hours, and then the operator begins broadcasting only the new mapping DM5, DM2, DM3 and DM4.

The duplicated mapping broadcast procedure can be enhanced by providing point-to-point transmission (i.e. in connected mode) of mapping information. In such a variation of the duplicated mapping broadcast procedure, the duplicated mapping is transmitted to each active mobile.

The network has the option according to the invention of including a new SI message on the SACCH channel (used for point-to-point communications for all mobiles in dedicated mode). The new SI message would be used at the time the change in dynamic mapping is to occur, from the time before the change to at least up to the time of the change is actually made. Mobiles in connected mode cannot receive the broadcast SI but if the dynamic mapping information is sent on the SACCH channel, then it can be acquired by all mobiles in dedicated mode.

The point-to-point broadcast requires less time for broadcasting a duplicated mapping and supports unlimited duration circuit-switched calls. Thus, if an operator, for some reason, would not want to transmit a duplicated mapping for more than one week and would still want to support calls lasting four weeks, then the point-to-point option is necessary. The operator may find the need to change the dynamic mapping after the start of a four-week long call. If the operator starts broadcasting a duplicated mapping and at any time while the duplicated mapping is being broadcast the operator sends the new mapping point to point on the SACCH, then the MS having the four-week long call will be able to receive information about changes in dynamic mapping.

In other words, if a long call is initiated by a MS before a network starts broadcasting a duplicated mapping (so as to change a dynamic ARFCN mapping), the MS (in dedicated mode) on the long call cannot decode the new information from the BCCH (because it is in dedicated mode), but can receive the new information through SACCH. The network may therefore start using the new ARFCN mapping information. In addition, there may be new SI5 messages describing new neighbor cells where ARFCNs according to the new mapping are used. The network may also command a handover using new mapping information. In all cases, the call may continue uninterrupted and all relevant tasks can be performed even if the dynamic mapping has changed.

FIG. 3 is a flowchart of the above-described aspect of the invention that provides for changes to a dynamic mapping carried out while a public land mobile network is in actual operation.

Discussion

The implementation details of the invention are not believed to require undue experimentation. In particular, the following details and issues are believed able to be determined in various ways within the scope of the invention without undue experimentation by one of ordinary skill in the art:

- the details of the dynamic mapping parameters ARFCN_FIRST, ARF_FIRST and ARFCN_RANGE;
- a full description of a new SI or PSI message capable of carrying several sets of mapping parameters (assuming an existing SI/PSI not having sufficient capacity);
- an indication of the existence of the new SI message being broadcast (i.e. some kind of signal indicating that the PLMN uses dynamic mapping);
- scheduling of the new SI message (how often and where on the BCCH the new SI message is to be found); and
- a definition for dynamic ARFCN mapping (including a requirement as to which mobiles shall support dynamic ARFCN mapping and, in addition, a requirement that the dynamic mapping, if used, shall take precedence over fixed numbering).

With respect to the indication of the existence of the new SI message being broadcast, if a MS is aware that dynamic mapping is in use by a PLMN, then the MS would know that dynamic mapping information is being broadcast by the PLMN, and the MS would then decode the new SI message conveying the dynamic mapping information. There is therefore a need for some kind of signal indicating that a PLMN is using dynamic mapping information. If such a signal is not provided, then a MS would have to spend quite a relatively long time to find out if dynamic mapping is being used by a PLMN.

Figure 4:
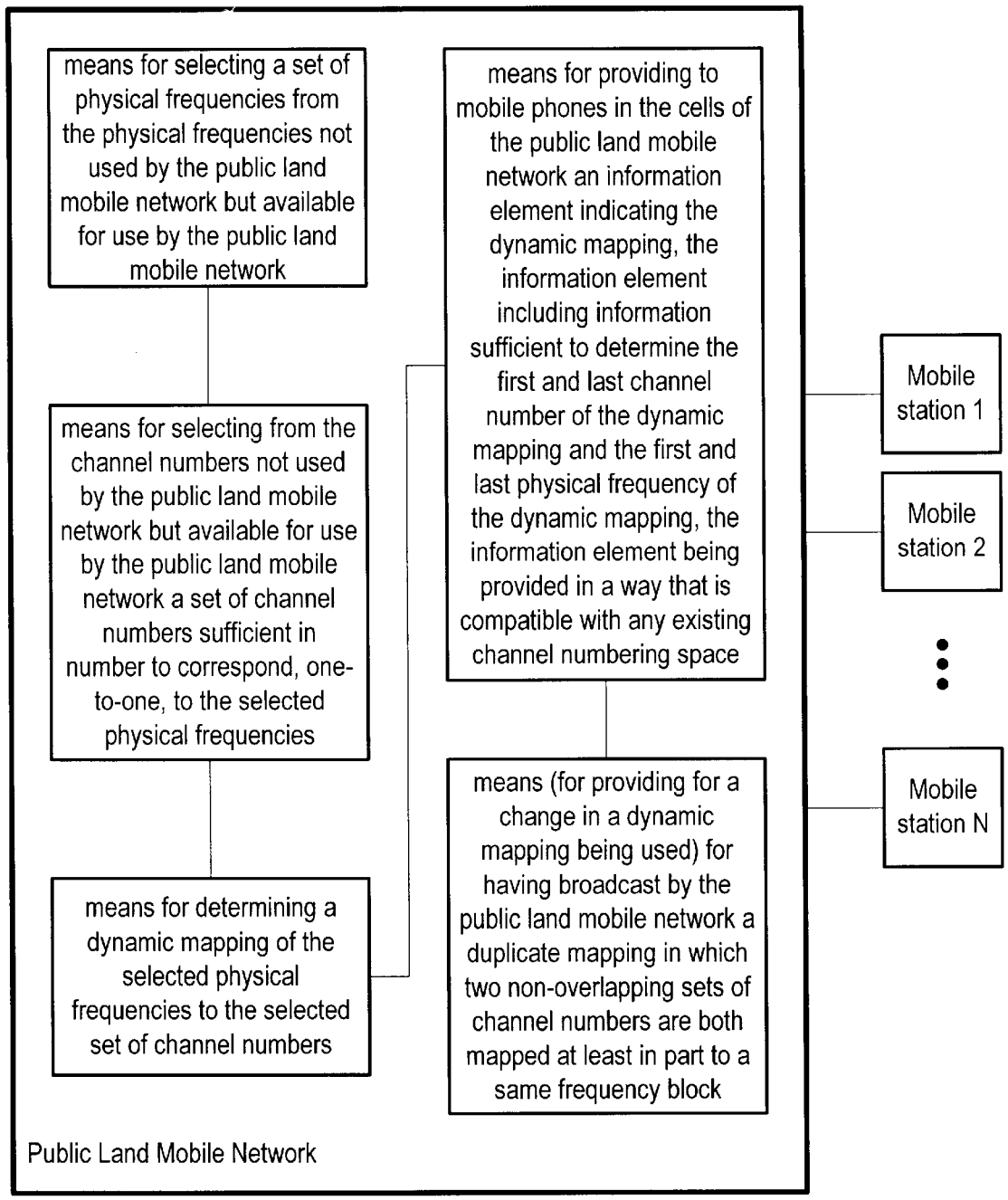
FIG. 4 is a block diagram of an apparatus according to the invention.

Referring now to FIG. 4, an apparatus according to the preferred embodiment of the invention is shown, as a combination of several components of a public land mobile network (which of course also includes many other components not shown), coupled to a plurality of mobile stations. The apparatus includes means for performing the steps necessary to create a dynamic mapping, to have the public land mobile network convey the dynamic mapping to mobile stations coupled to the public land mobile network, and to have the public land mobile network notify the mobile stations of any change in the dynamic mapping.

Scope of the Invention

It is to be understood that the above-described arrangements are only illustrative of the application of the principles of the present invention. Numerous modifications and alternative arrangements may be devised by those skilled in the art without departing from the spirit and scope of the present invention, and the appended claims are intended to cover such modifications and arrangements.

What is claimed is:

1. A method for providing for a dynamic mapping of channel numbers to physical frequencies for some cells of a cellular telephone system, the method for use in case of a cellular telephone system representing physical frequencies by channel numbers and providing a fixed mapping of channel numbers to physical frequencies, the cellular telephone system composed of a plurality of public land mobile networks each of which provide coverage in a different set of cells of the cellular telephone system, the dynamic mapping to be used by a particular public land mobile network and so for all the cells for which cellular communication is provided by the particular public land mobile network, the method comprising the steps of:

a) selecting a set of physical frequencies;
   b) selecting from the channel numbers a set of channel numbers sufficient in number to correspond, one-to-one, to the selected physical frequencies;
   c) determining a dynamic mapping of the selected physical frequencies to the selected set of channel numbers; and
   d) providing to mobile phones in the cells of the public land mobile network an information element indicating the dynamic mapping, the information element including information sufficient to determine the first and last channel number of the dynamic mapping and the first and last physical frequency of the dynamic mapping;
      wherein the step of providing the information element indicating the dynamic mapping is performed in a way that is compatible with an existing channel numbering space, and so allows keeping unchanged any existing signaling messages.

2. A method as in claim 1, wherein the channel numbers are represented using numbers indicated by at most 10 bits.

3. A method as in claim 1, wherein the cellular telephone system has unused channel numbers and unused physical frequencies.

4. A method as in claim 3, wherein in the step of selecting a set of physical frequencies, the physical frequencies are selected from the physical frequencies not used by the public land mobile network but available for use by the public land mobile network.

5. A method as in claim 4, wherein in the step of selecting channel numbers, the channel numbers are selected from the channel numbers not used by the public land mobile network but available for use by the public land mobile network.

6. A method as in claim 5, further wherein the dynamic mapping is specific to the public land mobile network in that the dynamic mapping would provide channel numbers for only the frequencies actually used by the public land mobile network.

7. A method as in claim 1, wherein the information element includes: a first value indicating the first channel number being mapped; a range value indicating the number of channel numbers being mapped in addition to the channel number indicated by the first value; and a first frequency value, indicating the physical frequency to which the first channel number is being mapped.

8. A method for providing for a dynamic mapping of channel numbers to physical frequencies for some cells of a cellular telephone system, the method for use in case of a cellular telephone system representing physical frequencies by channel numbers and providing a fixed mapping of channel numbers to physical frequencies, the cellular telephone system composed of a plurality of public land mobile networks each of which provide coverage in a different set of cells of the cellular telephone system, the dynamic mapping to be used by a particular public land mobile network and so for all the cells for which cellular communication is provided by the particular public land mobile network, the method comprising the steps of:

a) selecting a set of physical frequencies;
   b) selecting from the channel numbers a set of channel numbers sufficient in number to correspond, one-to-one, to the selected physical frequencies;
   c) determining a dynamic mapping of the selected physical frequencies to the selected set of channel numbers; and
   d) providing to mobile phones in the cells of the public land mobile network an information element indicating the dynamic mapping, the information element including information sufficient to determine the first and last channel number of the dynamic mapping and the first and last physical frequency of the dynamic mapping;

wherein the step of providing the information element indicating the dynamic mapping is performed in a way that is compatible with an existing channel numbering space, and so allows keeping unchanged any existing signaling messages;

and further wherein to provide for a change in a dynamic mapping being used by a public land mobile network, a duplicated mapping is broadcast by the public land mobile network in which two non-overlapping sets of channel numbers are mapped, the broadcasting being continued for a predetermined time period assumed to be of sufficient extent that any mobile phones operating in the cells of the public land mobile network will have decoded the duplicated mapping.

9. A method as in claim 8, wherein the channel numbers are represented using numbers indicated by at most 10 bits.

10. A method as in claim 8, wherein the cellular telephone system has unused channel numbers and unused physical frequencies.

11. A method as in claim 10, wherein in the step of selecting a set of physical frequencies, the physical frequencies are selected from the physical frequencies not used by the public land mobile network but available for use by the public land mobile network.

12. A method as in claim 11, wherein in the step of selecting channel numbers, the channel numbers are selected from the channel numbers not used by the public land mobile network but available for use by the public land mobile network.

13. A method as in claim 12, further wherein the dynamic mapping is specific to the public land mobile network in that the dynamic mapping would provide channel numbers for only the frequencies actually used by the public land mobile network.

14. A method according to claim 8, wherein one of said non-overlapping sets of channel numbers describes the allocation before the change of the dynamic mapping and the other of said non-overlapping channel numbers describes the allocation after the change of the dynamic mapping.

15. A method according to claim 8, wherein the non-overlapping sets of channel numbers are both mapped at least in part to a same frequency block.

16. A method as in claim 8, wherein the information element includes: a first value indicating the first channel number being mapped; a range value indicating the number of channel numbers being mapped in addition to the channel number indicated by the first value; and a first frequency value, indicating the physical frequency to which the first channel number is being mapped.

17. A method as in claim 8, wherein instead of broadcasting the duplicated mapping, the public land mobile network conveys the duplicated mapping via a point-to-point transmission to each mobile phone using the public land mobile network.

18. An apparatus for providing a dynamic mapping of channel numbers to physical frequencies for some cells of a cellular telephone system, the apparatus for use in case of a cellular telephone system representing physical frequencies by channel numbers and providing a fixed mapping of channel numbers to physical frequencies, the cellular telephone system composed of a plurality of public land mobile networks each of which provide coverage in a different set of cells of the cellular telephone system, the dynamic mapping to be used by a particular public land mobile network and so for all the cells for which cellular communication is provided by the particular public land mobile network, the apparatus comprising:

a) means for selecting a set of physical frequencies;
b) means for selecting from the channel numbers a set of channel numbers sufficient in number to correspond, one-to-one, to the selected physical frequencies;
c) means for determining a dynamic mapping of the selected physical frequencies to the selected set of channel numbers; and
d) means for having the public land mobile network provide to mobile phones in the cells of the public land mobile network an information element indicating the dynamic mapping, the information element including information sufficient to determine the first and last channel number of the dynamic mapping and the first and last physical frequency of the dynamic mapping;

wherein the information element indicating the dynamic mapping is provided in a way that is compatible with an existing channel numbering space, and so allows keeping unchanged any existing signaling messages.

19. An apparatus as in claim 18, wherein the channel numbers are represented using numbers indicated by at most 10 bits.

20. An apparatus as in claim 18, wherein the cellular telephone system has unused channel numbers and unused physical frequencies.

21. An apparatus as in claim 20, wherein the selected physical frequencies are selected from the physical frequencies not used by the public land mobile network but available for use by the public land mobile network.

22. An apparatus as in claim 21, wherein the channel numbers are selected from the channel numbers not used by the public land mobile network but available for use by the public land mobile network.

23. An apparatus as in claim 22, further wherein the dynamic mapping is specific to the public land mobile network in that the dynamic mapping would provide channel numbers for only the frequencies actually used by the public land mobile network.

24. An apparatus as in claim 18, wherein the information element includes: a first value indicating the first channel number being mapped; a range value indicating the number of channel numbers being mapped in addition to the channel number indicated by the first value; and a first frequency value, indicating the physical frequency to which the first channel number is being mapped.

25. An apparatus for providing for a dynamic mapping of channel numbers to physical frequencies for some cells of a cellular telephone system, the apparatus for use in case of a cellular telephone system representing physical frequencies by channel numbers and providing a fixed mapping of channel numbers to physical frequencies, the cellular telephone system composed of a plurality of public land mobile networks each of which provide coverage in a different set of cells of the cellular telephone system, the dynamic mapping to be used by a particular public land mobile network and so for all the cells for which cellular communication is provided by the particular public land mobile network, the apparatus comprising:

a) means for selecting a set of physical frequencies;
b) means for selecting from the channel numbers a set of channel numbers sufficient in number to correspond, one-to-one, to the selected physical frequencies;
c) means for determining a dynamic mapping of the selected physical frequencies to the selected set of channel numbers; and
d) means for having the public land mobile network provide to mobile phones in the cells of the public land mobile network an information element indicating the dynamic mapping, the information element including information sufficient to determine the first and last channel number of the dynamic mapping and the first and last physical frequency of the dynamic mapping;

wherein the information element indicating the dynamic mapping is provided in a way that is compatible with an existing channel numbering space, and so allows keeping unchanged any existing signaling messages;

and further wherein to provide for a change in a dynamic mapping being used by a public land mobile network, the apparatus includes means for having the public land mobile network broadcast a duplicated mapping in which two non-overlapping sets of channel numbers are mapped, the broadcasting being continued for a predetermined time period assumed to be of sufficient extent that any mobile phones operating in the cells of the public land mobile network will have decoded the duplicated mapping.

26. A method as in claim 25, wherein the channel numbers are represented using numbers indicated by at most 10 bits.

27. An apparatus as in claim 25, wherein the cellular telephone system has unused channel numbers and unused physical frequencies.

28. An apparatus as in claim 27, wherein the selected physical frequencies are selected from the physical frequencies not used by the public land mobile network but available for use by the public land mobile network.

29. An apparatus as in claim 28, wherein the selected channel numbers are selected from the channel numbers not used by the public land mobile network but available for use by the public land mobile network.

30. An apparatus as in claim 29, further wherein the dynamic mapping is specific to the public land mobile network in that the dynamic mapping would provide channel numbers for only the frequencies actually used by the public land mobile network.

31. An apparatus according to claim 25, wherein one of said non-overlapping sets of channel numbers describes the allocation before the change of the dynamic mapping and the other of said non-overlapping channel numbers describes the allocation after the change of the dynamic mapping.

32. An apparatus according to claim 25, wherein the non-overlapping sets of channel numbers are both mapped at least in part to a same frequency block.

33. An apparatus as in claim 25, wherein the information element includes: a first value indicating the first channel number being mapped; a range value indicating the number of channel numbers being mapped in addition to the channel number indicated by the first value; and a first frequency value, indicating the physical frequency to which the first channel number is being mapped.

34. An apparatus as in claim 25, wherein instead of broadcasting the duplicated mapping, the apparatus conveys the duplicated mapping on behalf of the public land mobile network via a point-to-point transmission to each mobile phone using the public land mobile network.

* * * * *